United States Patent
Ryu et al.

(10) Patent No.: US 10,056,589 B2
(45) Date of Patent: Aug. 21, 2018

(54) METHOD OF MANUFACTURING SEPARATOR FOR ELECTROCHEMICAL DEVICE AND SEPARATOR FOR ELECTROCHEMICAL DEVICE MANUFACTURED THEREBY

(71) Applicant: LG CHEM, LTD., Seoul (KR)

(72) Inventors: Bi-Oh Ryu, Daejeon (KR); Heon-Sik Song, Daejeon (KR)

(73) Assignee: LG CHEM, LTD., Seoul (KR)

( * ) Notice: Subject to any disclaimer, the term of this patent is extended or adjusted under 35 U.S.C. 154(b) by 208 days.

(21) Appl. No.: 14/902,981

(22) PCT Filed: Oct. 31, 2014

(86) PCT No.: PCT/KR2014/010393
§ 371 (c)(1),
(2) Date: Jan. 5, 2016

(87) PCT Pub. No.: WO2015/065122
PCT Pub. Date: May 7, 2015

(65) Prior Publication Data
US 2016/0141574 A1 May 19, 2016

(30) Foreign Application Priority Data

Oct. 31, 2013 (KR) .................. 10-2013-0131161
Oct. 31, 2014 (KR) .................. 10-2014-0150288

(51) Int. Cl.
*H01M 2/14* (2006.01)
*H01M 2/16* (2006.01)
(Continued)

(52) U.S. Cl.
CPC .......... *H01M 2/145* (2013.01); *B01D 67/003* (2013.01); *B01D 67/0027* (2013.01);
(Continued)

(58) Field of Classification Search
None
See application file for complete search history.

(56) References Cited

U.S. PATENT DOCUMENTS 3,322,553 A 5/1967 Seifried et al.
7,638,241 B2 * 12/2009 Lee .................. H01M 2/14
429/129
(Continued)

FOREIGN PATENT DOCUMENTS

CN 101828283 A 9/2010
CN 101469078 B 12/2011
(Continued)

OTHER PUBLICATIONS

International Search Report issued in PCT/KR2014/010393 dated Mar. 12, 2015.
(Continued)

*Primary Examiner* — Rena Dye Cronin
(74) *Attorney, Agent, or Firm* — Birch, Stewart, Kolasch & Birch, LLP

(57) ABSTRACT

A method of manufacturing a separator for an electrochemical device according to an exemplary embodiment of the present disclosure includes extruding a resin composition including polyolefin and a diluent, stretching the extruded resin composition to obtain a polyolefin film, extracting the diluent from the obtained polyolefin film to obtain a porous polyolefin film, coating a slurry for forming a porous coating layer on at least one surface of the porous polyolefin film, and heat setting the porous polyolefin film coated with the slurry to obtain a composite separator with a porous coating layer.

20 Claims, 2 Drawing Sheets

(51) Int. Cl.
   *H01M 10/052*   (2010.01)
   *B01D 67/00*   (2006.01)
   *B01D 71/26*   (2006.01)

(52) U.S. Cl.
   CPC ..... *B01D 67/0079* (2013.01); *B01D 67/0083* (2013.01); *B01D 67/0088* (2013.01); *B01D 71/26* (2013.01); *H01M 2/1653* (2013.01); *H01M 2/1686* (2013.01); *H01M 10/052* (2013.01)

(56) References Cited

U.S. PATENT DOCUMENTS

| | | | |
|---|---|---|---|
| 9,627,672 B2* | 4/2017 | Murata | H01M 10/0525 |
| 2003/0104273 A1 | 6/2003 | Lee et al. | |
| 2006/0073345 A1 | 4/2006 | Naruse | |
| 2008/0280141 A1* | 11/2008 | Dobbs | B82Y 30/00 |
| | | | 428/403 |
| 2008/0292968 A1 | 11/2008 | Lee et al. | |
| 2009/0042104 A1 | 2/2009 | Lee et al. | |
| 2009/0111026 A1* | 4/2009 | Kim | H01M 2/145 |
| | | | 429/252 |
| 2009/0155678 A1 | 6/2009 | Less et al. | |
| 2009/0274955 A1* | 11/2009 | Kikuchi | B01D 67/0027 |
| | | | 429/144 |
| 2010/0129720 A1 | 5/2010 | Sako et al. | |
| 2011/0027642 A1 | 2/2011 | Lee et al. | |
| 2011/0059368 A1* | 3/2011 | Inagaki | H01M 2/1653 |
| | | | 429/246 |
| 2011/0268942 A1 | 11/2011 | Rhee et al. | |
| 2012/0015254 A1* | 1/2012 | Lee | H01M 2/145 |
| | | | 429/246 |
| 2012/0164538 A1 | 6/2012 | Inagaki et al. | |
| 2013/0089770 A1 | 4/2013 | Nishikawa | |
| 2013/0171499 A1 | 7/2013 | Yang et al. | |
| 2013/0236767 A1 | 9/2013 | Nishikawa et al. | |
| 2013/0287937 A1 | 10/2013 | Joo et al. | |
| 2014/0370358 A1* | 12/2014 | Hong | H01M 10/052 |
| | | | 429/126 |

FOREIGN PATENT DOCUMENTS

| | | |
|---|---|---|
| JP | 9-76437 A | 3/1997 |
| JP | 2007-182464 A | 7/2007 |
| JP | 2009-518809 A | 5/2009 |
| JP | 2009-87948 A | 4/2013 |
| KR | 10-0406690 B1 | 11/2003 |
| KR | 10-2009-0077812 A | 7/2009 |
| KR | 10-2012-0015729 A | 2/2012 |
| KR | 10-2013-0036043 A | 4/2013 |
| KR | 10-2013-0037386 A | 4/2013 |
| KR | 10-2013-0066746 A | 6/2013 |
| KR | 10-2013-0099463 A | 9/2013 |

OTHER PUBLICATIONS

Written Opinion of the International Searching Authority issued in PCT/KR2014/010393 dated Mar. 12, 2015.

* cited by examiner

METHOD OF MANUFACTURING SEPARATOR FOR ELECTROCHEMICAL DEVICE AND SEPARATOR FOR ELECTROCHEMICAL DEVICE MANUFACTURED THEREBY

TECHNICAL FIELD

The present disclosure relates to a method of manufacturing a separator for an electrochemical device and a separator for an electrochemical device manufactured thereby, and more particularly, to a method of manufacturing a separator for an electrochemical device with improved mechanical/thermal performance and a separator for an electrochemical device manufactured thereby.

The present application claims priority to Korean Patent Application No. 10-2013-0131161 filed in the Republic of Korea on Oct. 31, 2013, the disclosures of which are incorporated herein by reference.

Also, the present application claims priority to Korean Patent Application No. 10-2014-0150288 filed in the Republic of Korea on Oct. 31, 2014, the disclosures of which are incorporated herein by reference.

BACKGROUND ART

Recently, there has been growing interest in energy storage technologies. As the application fields of energy storage technologies have been extended to mobile phones, camcorders, laptop computers and even electric cars, efforts have increasingly been made towards the research and development of electrochemical devices.

In this aspect, electrochemical devices have attracted the most attention. Among them, the development of rechargeable secondary batteries has been the focus of particular interest. In recent years, extensive research and development has been conducted to design new electrodes and batteries for the purpose of improving capacity density and specific energy of the batteries.

Assessing and ensuring the safety of electrochemical devices is very important. One of the most important considerations is that electrochemical devices should not cause damage to users in the event of malfunction, and for this purpose, Safety Standards impose strict regulations on ignition and explosion of electrochemical devices. In the safety characteristics of electrochemical devices, electrochemical devices have a high risk of explosion in the event of overheat or thermal runaway of an electrochemical device or penetration of a separator. Particularly, a polyolefin porous substrate commonly used for a separator of an electrochemical device shows serious thermal contraction behaviors at temperature less than or equal to 150° C. due to material characteristics and procedural characteristics in the manufacturing process including stretching, causing a short circuit between a cathode and an anode.

To solve the problem, a composite separator with a porous coating layer has been proposed in which a slurry including inorganic particles or organic particles and a binder polymer is coated on at least one surface of a polyolefin porous substrate having a plurality of pores. In the composite separator, the inorganic/organic particles in the coating layer of the polyolefin porous substrate serve as a support to maintain a mechanical shape of the coating layer, and thus prevent the polyolefin porous substrate from thermally contracting when a lithium ion battery is overheated.

Referring to FIG. 1, a process for manufacturing such a separator according to a related art includes the steps of extruding a polyolefin resin composition, stretching the extruded resin composition to obtain a film on a sheet, extracting a diluent from the obtained separator to obtain a porous film, heat setting the porous film, winding/slitting the heat-set porous film, unwinding, applying a coating slurry, drying the coating slurry, secondary winding/slitting, and packing a product.

According to the process according to the related art, there is a limitation that the heat setting process should be performed at temperature not causing the polyolefin film to be melted. Also, due to a risk of destruction of structural stability after coating and drying of the slurry on the porous substrate, it is difficult to perform an additional heat setting process.

Also, Japanese Patent No. 5543715 discloses a method of manufacturing a separator for a non-aqueous electrolyte battery including (i) melt-kneading polyolefin resin and a diluent, or polyolefin resin, a diluent, and an inorganic agent and extruding the mixture, (ii) stretching the obtained extruded product, (iii) extracting the diluent or the diluent and the inorganic agent. However, this does not correspond to a method involving coating a slurry including inorganic particles and others after forming a porous substrate, and does not provide a description of an order of slurry coating and heat setting steps and their specific conditions.

Also, Korean Patent Registration No. 10-0406690 discloses that a multicomponent film used as a separator for an electrochemical device is manufactured by a method including i) providing a polymer support film; ii) dissolving gelling polymer in a solvent to prepare a gelling polymer solution; iii) forming a gelling polymer layer from the gelling polymer solution of the step ii) on one surface or both surfaces of the support film of the step i) to manufacture a multilayer film; and iv) stretching and heat setting the multilayer film of the step iii). However, this paper just teaches coating the gelling polymer solution on the porous substrate to form the gelling polymer layer, and does not disclose a step of coating a slurry including organic particles or inorganic particles to form a porous coating layer. Also, because this paper involves coating the gelling polymer layer on the polymer support film and then stretching and heat setting of the obtained multilayer film, in the case of a composite film with a porous coating layer including organic particles and/or inorganic particles, cracking may occur in the coating layer in a TD direction during stretching after coating, which is a limitation on applications.

DISCLOSURE

Technical Problem

The present disclosure is designed to solve the above problem, and therefore, the present disclosure is directed to providing a method of manufacturing a separator for an electrochemical device in which a composite separator with a porous coating layer has improved structural stability, reduced process costs, and an increased production yield.

These and other objects and advantages of the present disclosure will be understood by the following description. Also, it will be apparent that the objects and advantages of the present disclosure may be realized by means or methods stated in the appended claims, and combinations thereof.

Technical Solution

To achieve the above object, according to one aspect of the present disclosure, provided is a method of manufacturing a separator for an electrochemical device including extruding a resin composition including polyolefin and a diluent, stretching the extruded resin composition to obtain a polyolefin film, extracting the diluent from the obtained polyolefin film to obtain a porous polyolefin film, coating a slurry for forming a porous coating layer on at least one surface of the porous polyolefin film, and heat setting the porous polyolefin film coated with the slurry to obtain a composite separator with a porous coating layer.

The stretching of the extruded resin composition may include uniaxial stretching at least once in a machine direction (MD) or a transverse direction (TD), or biaxial stretching at least once in the MD direction and the TD direction.

A temperature of the heat setting may be less than or equal to Tm−1° C., where Tm corresponds to a melting point of the polyolefin.

A temperature of the heat setting may be from 131° C. to 134° C.

The heat setting may be performed using a heat source facing in a perpendicular direction to the surface of the slurry coated on the porous polyolefin film.

The polyolefin may include polyethylene; polypropylene; polybutylene; polypentene: polyhexene: polyoctene: copolymers of at least one of ethylene, propylene, butene, pentene, 4-methylpentene, hexene and octene, or mixtures thereof.

The diluent may include at least one selected from the group consisting of paraffin oil, mineral oil, wax, soybean oil, phthalic acid esters, aromatic esters, fatty acids having 10 to 20 carbons; fatty acid alcohols having 10 to 20 carbons; and fatty acid esters.

A thickness of the porous polyolefin film may be from 5 to 50 μm, and a pore size and a porosity may be from 0.01 to 50 μm and from 10 to 95%, respectively.

The slurry for forming a porous coating layer may include at least one type of particles of inorganic particles and organic particles, a binder polymer, and a solvent.

The binder polymer may include polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, or mixtures thereof.

The inorganic particles may include inorganic particles having a dielectric constant greater than or equal to 5, inorganic particles capable of transporting lithium ions, or mixtures thereof.

The inorganic particles having a dielectric constant greater than or equal to 5 may include $BaTiO_3$, $Pb(Zr,Ti)O_3$(PZT), $Pb_{1-x}La_xZr_{1-y}Ti_yO_3$(PLZT), $PB(Mg_{3}Nb_{2/3})O_3$—$PbTiO_3$(PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or mixtures thereof.

The inorganic particles capable of transporting lithium ions may include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$ based glass ($Li_xSi_yS_z$, 0<x<3, 0<y<2, 0<z<4), $P_2S_5$ based glass ($Li_xP_yS_z$, 0<x<3, 0<y<3, 0<z<7), or mixtures thereof.

The organic particles may include polystyrene, polyethylene, melamine-based resin, phenol-based resin, cellulose, modified cellulose, polypropylene, polyester, polyphenylene sulfide, polyaramide, polyamide imide, polyimide, butylacrylate-ethylmethacrylate copolymers, or mixtures thereof.

Each average grain diameter of the inorganic particles and the organic particles may be independently from 0.001 to 10 μm.

The method may further include winding and slitting the composite separator.

The method may not include heat setting and winding and slitting before the coating of the slurry for forming a porous coating layer.

The method may further include packing the wound and slit composite separator.

Also, according to one aspect of the present disclosure, provided is a separator for an electrochemical device manufactured by the above-described method.

Also, according to one aspect of the present disclosure, provided is an electrochemical device including a cathode, an anode, and a separator interposed between the cathode and the anode, wherein the separator is the above-described separator for an electrochemical device.

The electrochemical device may be a lithium secondary battery.

Advantageous Effects

According to one embodiment of the present disclosure, a separator is manufactured by an extrusion process, a stretching process, a diluent extraction process, a slurry coating process, and a heat setting process in a sequential order, so heat setting/winding and slitting/unwinding processes conventionally performed between the diluent extraction process and the slurry coating process may be dramatically omitted.

Also, according to one embodiment of the present disclosure, the introduction of the heat setting process after the slurry coating may have various advantages such as property improvement of a composite separator, production cost reduction, high quality, production yield improvement, ultra-wide coating implementation, and space utility.

Specifically, according to one embodiment of the present disclosure, as the slurry coating is performed on a porous polyolefin film, the heat setting is performed at higher temperatures than a traditional heat setting temperature, so a composite separator with improved mechanical and thermal performance and excellent air permeability may be provided and a heat setting oven may reduce in length, thereby space utility and process costs and production costs may be saved.

Furthermore, according to one embodiment of the present disclosure, because a heat setting step before the slurry coating step is omitted, a heat setting oven and a drying oven may be simultaneously used instead of separately using them as in a related art, so space utility and cost reduction may be achieved.

Also, because a composite separator with a porous coating layer is manufactured by performing the heat setting after the slurry coating, heat applied during the heat setting process is transmitted to the polyolefin film through the porous coating layer, so heat setting at a comparatively high temperature is enabled and wettability of a coating slurry on a fibril structure of the polyolefin film is improved.

Also, as heat applied during the heat setting process is transmitted to the polyolefin film through the porous coating layer, the polyolefin film has fibrils of a smaller diameter, so fibrilar number density per unit area increases and an interfacial contact area with the coating slurry for forming a porous coating layer increases, thereby maintenance of a mechanical shape of the polyolefin film is made easier, thermal shrinkage of the composite separator is reduced or prevented, and the peeling strength of the coating layer is improved.

BRIEF DESCRIPTION OF THE DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR CARRYING OUT THE INVENTION

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

A method of manufacturing a separator for an electrochemical device according to one aspect of the present disclosure includes extruding a resin composition including polyolefin and a diluent, stretching the extruded resin composition to obtain a polyolefin film, extracting the diluent from the obtained polyolefin film to obtain a porous polyolefin film, coating a slurry for forming a porous coating layer on at least one surface of the porous polyolefin film, and heat setting the porous polyolefin film coated with the slurry to obtain a composite separator with a porous coating layer.

Figure 2:
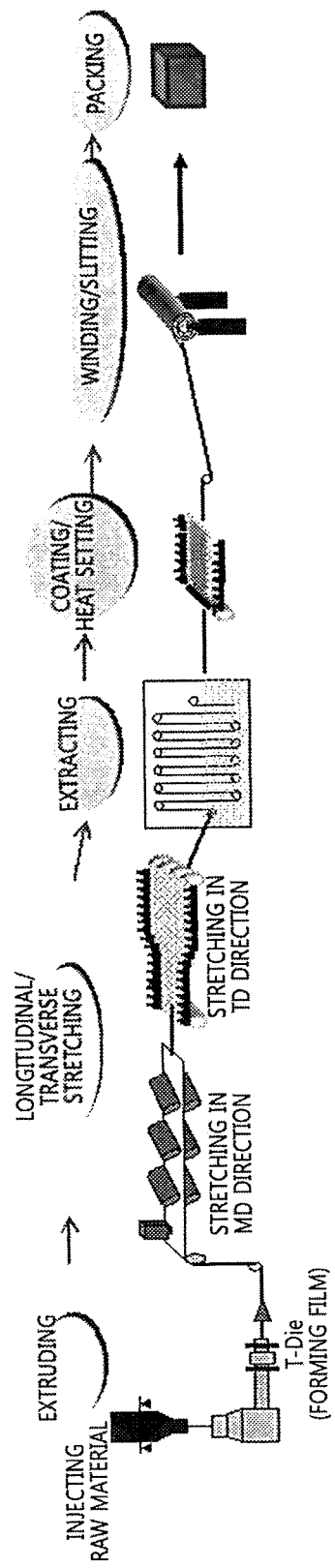
FIG. 2 is a conceptual diagram illustrating a method of manufacturing a separator for an electrochemical device according to an exemplary embodiment of the present disclosure.

FIG. 2 is a conceptual diagram illustrating a method of manufacturing a separator for an electrochemical device according to an exemplary embodiment of the present disclosure.

Referring to FIG. 2, the method of manufacturing a separator for an electrochemical device according to an exemplary embodiment of the present disclosure may further include winding and slitting the heat-set composite separator to obtain a final product. Also, the method of manufacturing a separator for an electrochemical device according to an exemplary embodiment of the present disclosure may further include packing the wound and slit composite separator.

Figure 1:
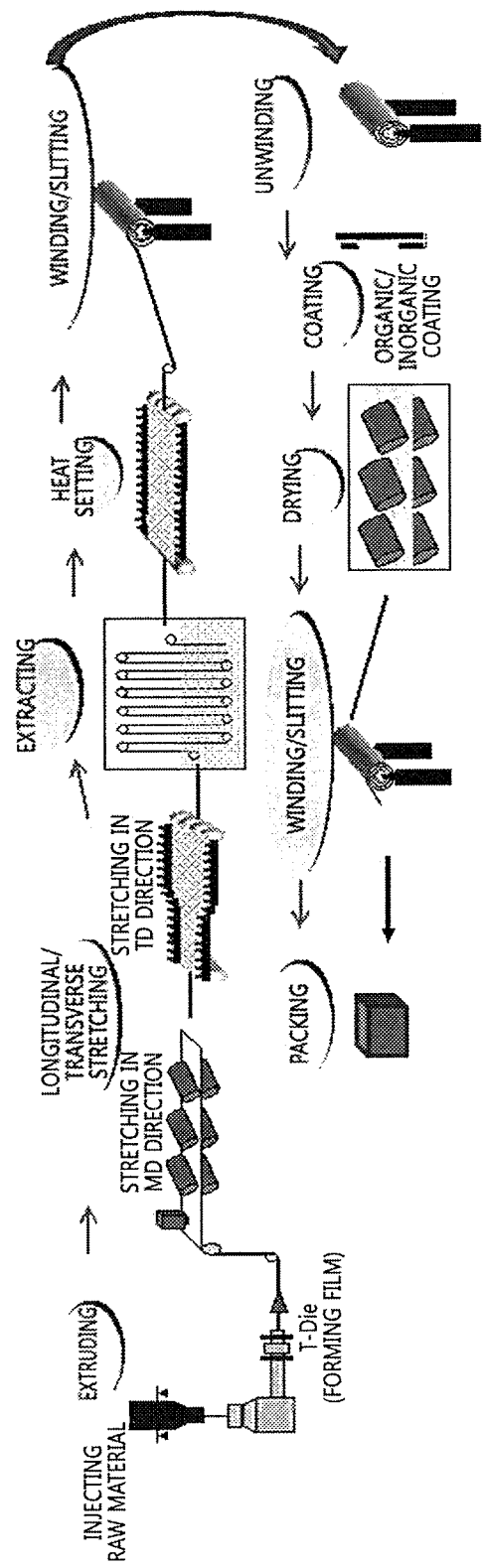
FIG. 1 is a conceptual diagram illustrating a process for manufacturing a separator for an electrochemical device according to a related art.

Also, the method of manufacturing a separator for an electrochemical device according to an exemplary embodiment of the present disclosure does not include a heat setting step and a winding and slitting step before coating the slurry for the porous coating layer, when compared to the manufacturing method according to the related art as shown in FIG. 1.

Specifically, according to an exemplary embodiment of the present disclosure, the separator is manufactured by the extrusion process, the stretching process, the diluent extracting process, the slurry coating process, and the heat setting process in a sequential order, and thus there is no need for a heat setting process, a winding and slitting process, and an unwinding process after the diluent extracting process as in the manufacturing method according to the related art as shown in FIG. 1, and these processes may be dramatically omitted.

Hereinafter, a detailed description of each step is provided.

First, in the extrusion step, the polyolefin is not limited to a particular type if it is commonly used in the art. The polyolefin may include, but is not limited to, for example, polyethylene such as high density polyethylene (HDPE), low density polyethylene (LDPE), linear low density polyethylene (LLDPE), ultra high molecular weight polyethylene (UHMWPE); polypropylene; polybutylene; polypentene: polyhexene: polyoctene: copolymers of at least one of ethylene, propylene, butene, pentene, 4-methylpentene, hexene, octene, or mixtures thereof.

Also, the diluent is not limited to a particular type if it is commonly used in the art. The diluent includes, as a non-limiting example, phthalic acid esters such as dibutyl phthalate, dihexyl phthalate, and dioctyl phthalate; aromatic ethers such as diphenyl ether and benzyl ether; fatty acids having 10 to 20 carbons such as palmitic acid, stearic acid, oleic acid, linoleic acid, and linolenic acid; fatty acid alcohols having 10 to 20 carbons such as palmityl alcohol, stearyl alcohol, oleyl alcohol, and the like; and a fatty acid ester derived from esterification of one or more saturated or unsaturated fatty acid having from 4 to 26 carbon atoms in the fatty acid group and an alcohol having from 1 to 8 hydroxy group(s) and from 1 to 10 carbon atom(s), such as palmitic acid mono-, di- or triester, stearic acid mono-, di- or triester, oleic acid mono-, di- or triester, linoleic acid mono-, di- or triester, and the like. Also, the diluent may include mixtures of at least two of the above substances.

A weight ratio of the polyolefin to the diluent may be in a range of 80:20 to 10:90, preferably in a range of 70:30 to 20:80, preferably in a range of 50:50 to 30:70. When the weight ratio is more than 80:20, that is, the content of the polyolefin is high, the porosity reduces, the pore size decreases, and interconnection of the pores is insufficient, and thus the permeability significantly reduces, as well as the viscosity of the polyolefin solution increases and the extrusion load increases, which makes processing difficult. When the weight ratio is less than 10:90, that is, the content of the polyolefin is low, the blending of the polyolefin and the diluent reduces and they are not thermodynamically miscible and are extruded in gel form, causing a problem with breakage during stretching and non-uniform thickness, and the manufactured separator may reduce in strength.

To manufacture the composite separator, the present disclosure first mixes a portion or all of the materials using Henschel Mixer, Ribbon Blender, and Tumbler Blender.

Subsequently, melt-kneading is performed by a screw extruder such as a single-screw extruder and a twin-screw extruder, a blender, and a mixer, and the mixture is extruded from a T-die or annular die. The blended/extruded melt may be solidified by compressed cooling, and a cooling method includes a direct contact method with a cooling medium such as cool air or cool water and a contact method with a roll or a press cooled by a coolant.

Subsequently, the extruded resin composition is stretched to obtain the polyolefin film. In this instance, as a stretching method, a common method known in the art may be performed, and the stretching method includes, as a non-limiting examples, MD (longitudinal direction) uniaxial stretching by a roll stretcher, TD (transverse direction) uniaxial stretching by a tenter, two step biaxial stretching by a combination of a roll stretcher and a tenter or a combination of a tenter and a tenter, and concurrent biaxial stretching by a concurrent biaxial tenter or inflation molding. Specifically, the stretching of the extruded resin composition may be performed by uniaxial stretching at least once in the MD direction or the TD direction, or biaxial stretching at least once in the MD direction and the TD direction.

A stretch ratio is three times or more each in the longitudinal direction and the transverse direction, preferably from 5 times to 10 times, and a total stretch ratio (total area magnification is 20 times or more, preferably from 20 to 80 times.

If the stretch ratio in one direction is less than 3 times, orientation in one direction is insufficient, and at the same time, the property balance between the longitudinal direction and the transverse direction is broken and the tensile strength and puncture strength may reduce. Also, when the total stretch ratio is less than (20) times, non-stretching occurs and pore formation may not be achieved, and when the total stretch ratio is more than (80) times, breakage occurs during stretching and shrinkage of a final film increases.

In this instance, a stretching temperature may change based on a melting point of the polyolefin used and a concentration and a type of the diluent, and preferably, the stretching temperature is selected within a temperature range in which 30 to 80 wt % of crystalline domains of the polyolefin in the film melt.

When the stretching temperature is selected within a temperature range lower than the temperature at which 30 wt % of crystalline domains of the polyolefin in the sheet molding product melt, softness of the film is low, the stretching characteristics are poor, and the likelihood that breakage will occur during stretching is high, and at the same time, non-stretching occurs. In contrast, when the stretching temperature is selected within a temperature range higher than the temperature at which 80 wt % of crystalline domains melt, stretching is easy and non-stretching occurs less frequently, but due to partial over-stretching, a thickness deviation occurs, and an orientation effect of resin are low and thus, the properties significantly reduce. In this instance, an extent to which the crystalline domains melt based on temperature may be obtained from differential scanning calorimeter (DSC) analysis of the film molding product.

Subsequently, the diluent is extracted from the stretched film to obtain the porous polyolefin film. Specifically, the diluent is extracted from the stretched film using an organic solvent, and is then dried.

As the extraction solvent used in extracting the diluent, it is preferred to use an extraction solvent which serves as a poor solvent for the polyolefin and a good solvent for the diluent, and has a boiling point lower than the melting point of the polyolefin and thus is dried quickly. The extraction solvent includes, as a non-limiting example, hydrocarbons such as n-hexane or cyclohexane, halogenated hydrocarbons such as methylene chloride, 1,1,1-trichloroethane and fluorocarbon, alcohols such as ethanol or isopropanol, and ketones such as acetone or 2-butanone.

As the extraction method, all general solvent extraction methods including an immersion method, a solvent spray method, and an ultrasonic method may be used, singularly or in combination. In the extraction, the content of the remaining diluent is preferably less than or equal to 1 wt %. When the content of the remaining diluent is more than 1 wt %, the properties reduce and the permeability of the porous membrane reduces. An amount of the remaining diluent may be influenced by an extraction temperature and an extraction time, and to increase the solubility of the diluent and the organic solvent, a high extraction temperature is good, but considering the safety problem with the boiling of the organic solvent, the extraction temperature is preferably less than or equal to 40° C. When the extraction temperature is less than or equal to a freezing point of the diluent, extraction efficiency greatly drops, and accordingly, the extraction temperature should be certainly higher than the freezing point of the diluent.

Also, the extraction time may change based on a thickness of the porous polyolefin film being manufactured, but when the thickness is from 10 to 30 μm, 2-4 minutes are proper.

The thickness of the porous polyolefin film obtained as above is not specially limited, but is preferably from 5 to 50 μm, and the pore size and the porosity of the porous substrate is not specially limited, but are preferably from 0.001 to 50 μm and from 10 to 99%, respectively.

Subsequently, the slurry for forming a porous coating layer is coated on at least one surface of the porous polyolefin film. To this end, first, the slurry for forming a porous coating layer is prepared, and the slurry is prepared by dispersing, in a solvent, at least one type of particles of inorganic particles and organic particles together with binder polymer. That is, the slurry may include either inorganic particles or organic particles or both.

The inorganic particles are not particularly limited if they are electrochemically stable. That is, the inorganic particles that may be used in the present disclosure are not particularly limited if they do not cause oxidation and/or reduction reactions in an operating voltage range (for example, from 0 to 5V for Li/Li$^+$) of an electrochemical device being applied. In particular, when inorganic particles capable of transporting ions are used, ionic conductivity in an electrochemical device increases, contributing to performance improvement. Also, when inorganic particles having a high dielectric constant are used as the inorganic particles, such inorganic particles may contribute to the increase in the degree of dissociation of an electrolyte salt, for example, a lithium salt, in a liquid electrolyte and may improve ionic conductivity of an electrolyte solution.

The inorganic particles include, as a non-limiting example, inorganic particles having a high dielectric constant greater than or equal to 5, preferably, greater than or equal to 10, inorganic particles capable of transporting lithium ions, or mixtures thereof.

The inorganic particles having a dielectric constant greater than or equal to 5 include, as a non-limiting example, $BaTiO_3$, $Pb(Zr,Ti)O_3(PZT)$, $Pb_{1-x}La_xZr_{1-y}Ti_yO_3(PLZT)$, $PB(Mg_3Nb_{2/3})O_3$—$PbTiO_3(PMN-PT)$, hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, or mixtures thereof In the specification, the 'inorganic particles capable of transporting lithium ions' refer to inorganic particles that contain lithium atoms and have a function of transferring a lithium ion without storing lithium, and the inorganic particles capable of transporting lithium ions includes, as a non-limiting example, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), ($LiAlTiP)_xO_y$ based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$ based glass ($Li_xSi_yS_z$, $0<x<3$, $0<y<2$, $0<z<4$) such as $Li_3PO_4$—$Li_2S$—$SiS_2$, $P_2S_5$ based glass ($Li_xP_yS_z$, $0<x<3$, $0<y<3$, $0<z<7$) such as $LiI$—$Li_2S$—$P_2S_5$, or mixtures thereof.

The organic particles included in the slurry are advantageous in aspects of air permeability, thermal shrinking characteristics, and peeling strength, and are excellent in binding with the binder polymer.

The organic particles that may be used in the slurry for forming a porous coating layer include, as a non-limiting example, particles consisting of various types of polymers such as polystyrene, polyethylene, melamine-based resin, phenol-based resin, cellulose, modified cellulose (carboxymethyl cellulose), polypropylene, polyester (polyethyleneterephthalate, polyethylenenaphthalate, and polybutyleneterephthalate), polyphenylene sulfide, polyaramide, polyamide imide, polyimide, and butylacrylate-ethylmethacrylate copolymers (crosslinked polymers of butylacrylate and ethylmethacrylate). The organic particles may consist of at least two types of polymers.

The size of the inorganic particles or the organic particles is not limited, but may be each in a range of 0.001 to 10 μm, independently, to form a coating layer with a uniform thickness and have a proper porosity.

The binder polymer used in the slurry for forming a porous coating layer is not limited to a particularly type if it functions to connect the inorganic particles or the organic particles and stably hold them, and includes, as a non-limiting example, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, and polyimide, singularly or in combination.

A composition ratio of the inorganic particles and the binder polymer in the slurry for a porous coating layer may be, for example, in a range of 50:50 to 99:1, or in a range of 70:30 to 95:5, based on the weight. When the content of the particles to the binder polymer is excessively low, improvements in thermal safety of the separator may be reduced, and due to insufficient formation of interstitial volumes between the particles, the pore size and the porosity are reduced, causing a reduction in final battery performance. In contrast, when the content of the particles to the binder polymer is excessively high, the peeling resistance of the porous coating layer may be reduced.

As the solvent included in the slurry, it is preferred to use a solvent which allows uniform mixing of the particles and the binder polymer and subsequently can be removed at ease. Non-limiting examples of available solvents may include acetone, tetrahydrofuran, methylene chloride, chloroform, dimethylformamide, N-methyl-2-pyrrolidone (NMP), cyclohexane, water, or mixtures thereof.

The slurry for forming a porous coating layer is coated on at least one surface of the porous polyolefin film, and a specific method for coating may use a common coating method known in the art, and various methods may be used, for example, dip coating, die coating, roll coating, comma coating, or mixtures thereof. Also, the porous coating layer may be selectively formed on both surfaces or only one surface of the porous polyolefin film.

Subsequently, the porous polyolefin film coated with the slurry is heat-set to obtain the composite separator with the porous coating layer.

The heat setting is a process which fixes the film and applies heat, and although the film tends to shrink, forcibly holds the film to remove residual stress. As a heat setting temperature increases, the shrinkage preferably reduces, but when the heat setting temperature is excessively high, the polyolefin film partially melts and closes formed micro pores and the permeability may reduce.

Dissimilar to the traditional process that stretches to the polyolefin film, extracts the diluent, and performs heat setting, the present disclosure stretches to the polyolefin film, extracts the diluent, coats with the slurry for forming a porous coating layer, and performs heat setting, so heat setting is performed on the coated slurry rather than the polyolefin film, and heat is not directly applied to the polyolefin film.

Thus, although heat setting is performed at higher temperature than the method according to the related art, melting of the polyolefin film may be suppressed. Also, because the quantity of heat directly applied to the polyolefin film is small, as opposed to fibrils of the heat-set polyolefin film according to the related art, fibril of the polyethylene substrate adjacent to the porous coating layer is formed thin. Thus, the fibrilar number density per unit area of the porous film surface adjacent to the porous coating layer increases, an interfacial contact area with the coating slurry increases, and when heat setting is performed in a temperature range higher than a glass transition temperature ($T_g$) or a melting point ($T_m$) of the coating slurry, wettability of the slurry on the fibrilar structure of the porous polyolefin film may be improved.

The heat setting temperature is preferably adjusted to Tm−1° C. or less, and in this instance, Tm corresponds to the melting point of the polyolefin.

According to an exemplary embodiment of the present disclosure, when polyethylene is used as the polyolefin, the heat setting temperature may be from 131 to 135° C., preferably from 131 to 133° C., and when the heat setting temperature satisfies this range, the binding strength (peeling strength) of the porous coating layer and the porous polyolefin film may be improved, structural stability may be ensured, and the thermal and mechanical properties may be improved.

Also, the heat setting may be performed using a heat source facing in a perpendicular direction to the surface of the slurry coated on the porous polyolefin film.

In the heat setting step, because the heat source of high temperature faces in the perpendicular direction to the surface of the slurry coated on the porous polyolefin film as described in the foregoing, there is a high probability that the binder polymer in the coated slurry will be re-disposed toward the perpendicular direction to the surface of the porous polyolefin film. Thereby a coating layer structure allowing easy movement of lithium ions in the porous coating layer is formed, and lithium ions may communicate with the pores formed in the porous polyolefin film. Also, the binder polymer between the particles or the binder polymer incompletely bound with the particles is re-disposed by the recrystallization exerted by the high temperature heat source and the resistance by the binder polymer may significantly reduce. The tendency toward the high probability that the binder polymer will be disposed in the perpendicular direction is particularly effective in the case of binder polymer which forms a dense film on the porous polyolefin film due to poor dispersion in a solvent, particularly, like cyanoethyl polyvinylalcohol.

The thickness of the porous coating layer formed as above is not specially limited, but may be in a range of 0.01 to 20 µm, and the pore size and the porosity is not specially limited, but the pores size may be in a range of 0.001 to 10 µm and the porosity may be in a range of 10 to 99%. The pore size and the porosity mainly depends on the size of the particles used, and when particles with a grain diameter, for example, less than or equal to 1 µm are used, the resulting pores show approximately 1 µm or less in size.

In a state that the particles are packed in the porous coating layer while come into contact with each other, the particles are bound with each other by the binder polymer, thereby interstitial volumes are formed between the particles and the interstitial volumes between the particles become a void space to form pores.

That is, the binder polymer allows the particles to be adhered to each other to maintain the bound state of the particles, and for example, the binder polymer connects and holds the particles. Also, the pores of the porous coating layer are pores formed with the interstitial volumes between the particles that define voids, and this is a space defined by the particles substantially in surface contact in a closed packed or densely packed structure by the particles. This pore structure is filled with an electrolyte solution to be injected later, and the filled electrolyte solution may provide a channel for movement of lithium ions essential to operate a battery through the pores of the porous coating layer.

As described in the foregoing, the method of manufacturing a separator according to an exemplary embodiment of the present disclosure does not need a heat setting process, a winding and slitting process, and an unwinding process after the diluent extraction process, as opposed to the manufacturing method according to the related art as shown in FIG. 1.

Here, the winding process represents a step of winding, on a roller, the composite separator obtained by performing the slurry coating and heat setting on the porous polyolefin film obtained through the extrusion/stretching/extraction steps, and the slitting process represents a step of cutting an unnecessary part off from both ends when winding the composite separator. The method according to the related art performs the winding and slitting process after heat setting of the porous polyolefin film, and for slurry coating, needs to unwind the wound film, and after the slurry coating and drying process, performs the winding and slitting process again, finally followed by the packing step.

In this instance, according to an exemplary embodiment of the present disclosure, a number of winding and slitting processes reduces to one time instead of two times as in the method according to the related art, and a loss of a portion of the porous polyolefin film by the winding and slitting process is prevented, resulting in yield increase.

Also, because an unwinding process is omitted before the slurry coating step after the winding and slitting process as in the method according to the related art, the space utility and process costs may be saved. Further, because a slitting process before the slurry coating step or a winding/unwinding process is not performed, ultra-wide and large-area coating is enabled, occurrence of defects in a final separator such as wrinkles, pinholes, and scratches remarkably decreases and an uncoated area reduces.

Also, instead of two separate thermal treatment processes in the method according to the related art such as the heat setting process after the diluent extraction and the drying process after slurry coating, through improvements to a single thermal treatment process of the heat setting process after the slurry coating, a single heat setting oven may be used rather than two separate ovens such as a dry oven and a heat setting oven, and the space utility and cost savings may be achieved.

According to one aspect of the present disclosure, provided is an electrochemical device including a cathode, an anode, and a separator interposed between the cathode and the anode, in which the separator is the above-described separator for an electrochemical device.

The electrochemical device may be manufactured by a common method known in the art, and for example, may be manufactured by assembling the cathode and the anode with the separator interposed between the cathode and the anode and pouring an electrolyte solution.

The electrode to be applied together with the separator is not specially limited, and may be manufactured by binding an electrode active material to an electrode current collector by a common method known in the art.

Of the electrode active material, a cathode active material includes, as a non-limiting example, a general cathode active material that may be conventionally used in a cathode of an electrochemical device, and particularly, it is preferred to use lithium manganese oxide, lithium cobalt oxide, lithium nickel oxide, lithium iron oxide, or lithium composite oxides thereof. An anode active material includes, as a non-limiting example, a general anode active material that may be conventionally used in an anode of an electrochemical device, and particularly, a lithium adsorption material is preferred such as a lithium metal or a lithium alloy, carbon, petroleum coke, activated carbon, graphite, or other carbons.

A non-limiting example of a cathode current collector includes a foil made from aluminum, nickel, or a combination thereof, and a non-limiting example of an anode current collector includes a foil made from copper, gold, nickel or copper alloy or combinations thereof.

The electrolyte solution that may be used in an exemplary embodiment of the present disclosure may be an electrolyte solution in which a salt is dissolved or dissociated in an organic solvent, the salt having a structure represented by, for example, $A^+B^-$ wherein $A^+$ is an alkali metal cation such as $Li^+$, $Na^+$, $K^+$, or combinations thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, or combinations thereof, and the organic solvent including, but is not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

The pouring of the electrolyte solution may be performed in any suitable step of a battery manufacturing process based on a manufacturing process and required physical properties of a final product. That is, the pouring of the electrolyte solution may be applied before battery assembly of an electrochemical device or in the final step of battery assembly.

A process of applying the separator according to an exemplary embodiment of the present disclosure to a battery includes a general process such as a winding process, as well as a lamination/stacking process and a folding process of the separator and the electrode.

Hereinafter, the present disclosure will be described in detail through examples to help understanding. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

Example 1

High density polyethylene with a weight average molecular weight of 500,000 as polyolefin and liquid paraffin with a kinematic viscosity of 68.00 cSt as a diluent were extruded using a weight ratio of 35:65 at the temperature of 210° C. A stretching temperature was 115° C., and a stretch ratio was seven times each in a longitudinal direction and a transverse direction. Subsequently, the diluent, i.e., the liquid paraffin was extracted using methylene chloride as an extraction solvent under the condition of 2M/min to obtain a porous polyolefin film with an average pore size of 0.04 μm.

Subsequently, $Al_2O_3$ particles with an average grain diameter of 0.5 μm/cyanoethylpolyvinylalcohol (Cyano resin CR-V, Shin-Etsu Chemical, Ltd.)/PVDF-HFP (LBG2, Arkema, Inc.)/acetone was mixed at a weight ratio of 13.5/0.225/1.275/85 to prepare a slurry for forming a porous layer.

The slurry was coated in a thickness of 3.5 μm on one surface of the porous polyolefin film which completed the diluent extraction process, and subsequently, heat setting was performed at 132.5° C. and 5 m/min, to manufacture a 14.5 μm-thick separator with the porous coating layer. The porous coating layer of the obtained separator has an average pore size of 0.4 μm and an average porosity of 55%.

Example 2

A separator for an electrochemical device was manufactured by the same method as Example 1, except that using, as a slurry (Zeon, FX9022) for forming a porous layer, organic particles with an average grain diameter of 0.5 μm composed of a crosslinked polymer compound of butylacrylate and ethylmethacrylate, a binder (polybutylacrylate), a dispersant (carboxymethyl cellulose), and deionized water as a solvent at a weight ratio of 18/1.5/0.5/80, coating was performed on both surfaces of a porous polyethylene film in a coating thickness of 4.0 μm, and a heat setting temperature was 133° C. The porous coating layer of the obtained separator has an average pore size of 0.5 μm and an average porosity of 61%.

Comparative Example 1

A separator for an electrochemical device was manufactured by heat setting the same polyolefin film as used in Example 1 at 130° C., coating the same slurry for forming a porous coating layer as used in Example 1 in a thickness of 3.5 μm, and drying under the condition of 70° C. and 5M/min.

Comparative Example 2

A separator for an electrochemical device was manufactured by heat setting the same porous polyolefin film as used in Example 2 at 130° C., coating the same slurry for forming a porous coating layer as used in Example 2 on both surfaces in a thickness of 4.0 μm, and subsequently, drying under the condition of 70° C. and 5M/min.

Comparative Example 3

A separator for an electrochemical device was manufactured by heat setting the same polyolefin film as used in Example 1 at 130° C., coating the same slurry for forming a porous coating layer as used in Example 1 on one surface in a thickness of 3.5 μm, and heat setting under the condition of 132.5° C. and 5M/min again.

Comparative Example 4

A separator for an electrochemical device was manufactured by extruding at 210° C. as used in Example 1, annealing at 110° C., coating the same slurry for forming a porous coating layer as used in Example 1 on the annealed film in a thickness of 3.5 μm, stretching at a stretch ratio of seven times at 115° C., extracting in the same way as Example 1, and heat setting under the conditions of 132.5° C. and 5M/min again. The separator manufactured as above was improper to use as a separator because the coating layer was peeled off during stretching after coating.

Evaluation Example

Each separator for an electrochemical device according to Example 1 and Comparative example 1 was measured to determine a permeation time, a tensile strength, a thermal shrinkage, and water content, and their results are shown in the following Table 1.

(1) Permeation Time Measurement

The time (sec) required for air of 100 ml to pass through the separator was measured under the predetermined pressure (0.05 MPa) using an air permeation measuring machine (Maker: Asahi Seiko, Model: EG01-55-1MR). A total of three points, each one point in the left/middle/right of the sample, was measured and an average was recorded.

(2) Tensile Strength Measurement

When a separator specimen (length: 12 cm, width 1.5 cm) was pulled from both ends at a speed of 500 mm/min, a maximum value of stress the specimen can endure until the specimen breaks was measured three times using a tensile strength measuring machine (Maker: Instron: Model: 3345 UTM), and an average was recorded.

(3) Thermal Shrinkage Measurement

After a separator specimen (size: 50 mm×50 mm) was kept under the conditions of 120° C. and 60 min using a convection oven, the specimen was taken out and the length of a part where shrinkage occurred most severely was measured using a steel ruler at room temperature and converted to a thermal shrinkage. A total of three points, each one point in the left/middle/right of the sample was measured and an average was recorded.

Thermal shrinkage (%)=[1−(length of a part shrinkage occurred most severely)/(initial length)]×100

(4) Water Content Measurement

After a blank test was conducted under the condition of an oven temperature of 120° C. using Karl Fisher (Mettler toledo) instrument, nitrogen gas was injected into a vial in which a separator of about 0.5~0.6 g is put and its water content was measured for an extraction time of 5 min. A total of three points, each one point in the left/middle/right of the sample was measured and an average was recorded.

TABLE 1

| Classification | | Condition | | |
| --- | --- | --- | --- | --- |
| | | Comparative example 1 (existing process: heat setting → coating) | | Example 1 (improved process: coating → heat setting) |
| | | Fabric | Composite membrane | Composite membrane |
| Oven | | Heat setting oven | Coating dry oven | Heat setting oven |
| Oven length | M | 5 | 5 | 1 |
| Oven temperature | ° C. | 130 | 70 | 132.5 |
| Composite separator thickness | μm | 11.0 | 14.5 | 14.5 |
| Permeation time | Sec/100 ml | 170 | 240 | 200 |
| Tensile strength | MD | Kg/cm$^2$ | 1,800 | 1,800 | 2,300 |
| | TD | | 1,700 | 1,700 | 2,150 |
| Thermal shrinkage (120° C./1 hr) | MD | Kg/cm$^2$ | 10 | 7 | 6 |
| | TD | | 10 | 5 | 3 |
| Water content (120° C./5 min) | ppm | — | 825 | 770 |

Referring to the results shown in Table 1, when comparing Example 1 and Comparative example 1 using the same raw materials, only different in order of the heat setting process, it is found that Example 1 which coats the slurry including the inorganic particles after extracting the diluent from the polyolefin film shows better tensile strength and thermal shrinkage than Comparative example 1.

It is deemed that performance improvements such as tensile strength improvement and thermal shrinkage reduction are achieved by performing slurry coating on the extracted fabric and then heat setting this, and when compared to the traditional method (Comparative example 1) which performs slurry coating after heat setting, followed by the drying operation, the performance improvements are derived from a result of performing heat setting at higher temperature.

Furthermore, when such a high heat setting temperature is taken, the length of the heat setting oven may be reduced, so there is an advantage in terms of space utility, thereby the production cost reduction is enabled, and the water content is low by drying at the temperature higher than 130° C., leading to an advantage of being applicable to a battery sensitive to water.

Subsequently, each separator for an electrochemical device according to Example 2 and Comparative example 2 was measured to determine a permeation time, a tensile strength, a thermal shrinkage, and water content, and their results are shown in the following Table 2.

TABLE 2

| Classification | | Condition | | |
| --- | --- | --- | --- | --- |
| | | Comparative example 2 (existing process: heat setting → coating) | | Example 2 (improved process: coating → heat setting) |
| | | Fabric | Composite membrane | Composite membrane |
| Oven | | Heat setting oven | Coating dry oven | Heat setting oven |
| Oven length | M | 5 | 5 | 1 |
| Oven temperature | ° C. | 130 | 70 | 133 |
| Composite separator thickness | μm | 12.0 | 20.0 | 20.0 |
| Permeation time | Sec/100 ml | 230 | 340 | 270 |
| Tensile strength | MD | Kg/cm$^2$ | 1,800 | 1,850 | 2,300 |
| | TD | | 1,400 | 1,450 | 1,800 |
| Thermal shrinkage (120° C./1 hr) | MD | Kg/cm$^2$ | <7 | <5 | <4 |
| | TD | | <5 | <3 | <2 |
| Water content (120° C./5 min) | ppm | — | 910 | 898 |

Referring to the results shown in Table 2, similar to the results shown in Table 1 previously, it can be seen that the separator according to Example 2 where the heat setting process was performed after coating exhibits better tensile strength, thermal shrinkage and water content characteristics when compared to the separator according to Comparative example 2 where coating was performed after the heat setting process.

Subsequently, each separator for an electrochemical device according to Example 1 and Comparative example 3 was measured to determine a permeation time, a tensile strength, a thermal shrinkage, and water content, and their results are shown in the following Table 3.

TABLE 3

|  |  | Condition | | |
| --- | --- | --- | --- | --- |
|  |  | Comparative example 3 (existing process: heat setting → coating) | | Example 1 (improved process: coating → heat setting) |
| Classification | | Fabric | Composite membrane | Composite membrane |
| Oven | | Heat setting oven | Coating dry oven | Heat setting oven |
| Oven length | M | 5 | 5 | 1 |
| Oven temperature | ° C. | 130 | 132.5 | 132.5 |
| Composite separator thickness | μm | 11.0 | 14.5 | 14.5 |
| Permeation time | Sec/100 ml | 170 | 255 | 200 |
| Tensile MD | Kg/cm$^2$ | 1,800 | 1,800 | 2,300 |
| strength TD |  | 1,700 | 1,750 | 2,150 |
| Thermal MD | Kg/cm$^2$ | <10 | <7 | <6 |
| shrinkage TD |  | <10 | <4 | <3 |
| (120° C./1 hr) |  |  |  |  |
| Water content (120° C./5 min) | ppm | — | 735 | 770 |

Referring to the results shown in Table 3, in the case of Comparative example 3, the composite separator was manufactured by coating on one surface of the fabric heat set at 130° C. under the same coating condition as Example 1. In this case, because heat setting (annealing) was performed on the fabric before coating, binding between fibrils was already completed. When binding between fibrils was completed, although heat setting at temperature less than or equal to Tm is performed later, re-binding of thick fibrils is not easy and thus the mechanical strength and thermal characteristics are not greatly improved. Also, binding of the porous coating layer and the porous polyolefin film is not achieved, so it is not easy to exhibit excellent properties like Example 1.

While the present disclosure has been described in connection with a limited number of embodiments and drawings, the present disclosure is not limited thereto, and it should be understood that various changes and modifications may be made by those skilled in the art within the spirit and scope of the present disclosure and equivalents to the appended claims.

What is claimed is:

1. A method of manufacturing a separator for an electrochemical device, comprising:
    extruding a resin composition including polyolefin and a diluent;
    stretching the extruded resin composition to obtain a polyolefin film;
    extracting the diluent from the obtained polyolefin film to obtain a porous polyolefin film;
    coating a slurry for forming a porous coating layer on at least one surface of the porous polyolefin film; and
    heat setting the porous polyolefin film coated with the slurry to obtain a composite separator with a porous coating layer,
    wherein the method does not comprise heat setting before the coating of the slurry for forming a porous coating layer.

2. The method of manufacturing a separator for an electrochemical device according to claim 1, wherein the stretching of the extruded resin composition comprises uniaxial stretching at least once in a machine direction (MD) or a transverse direction (TD), or biaxial stretching at least once in the MD direction and the TD direction.

3. The method of manufacturing a separator for an electrochemical device according to claim 1, wherein a temperature of the heat setting is less than or equal to Tm−1° C., where Tm corresponds to a melting point of the polyolefin.

4. A method of manufacturing a separator for an electrochemical device, comprising:
    extruding a resin composition including polyolefin and a diluent;
    stretching the extruded resin composition to obtain a polyolefin film;
    extracting the diluent from the obtained polyolefin film to obtain a porous polyolefin film;
    coating a slurry for forming a porous coating layer on at least one surface of the porous polyolefin film; and
    heat setting the porous polyolefin film coated with the slurry to obtain a composite separator with a porous coating layer,
    wherein a temperature of the heat setting is from 131° C. to 134° C.

5. The method of manufacturing a separator for an electrochemical device according to claim 1, wherein the heat setting is performed using a heat source facing in a perpendicular direction to the surface of the slurry coated on the porous polyolefin film.

6. The method of manufacturing a separator for an electrochemical device according to claim 1, wherein the polyolefin includes polyethylene; polypropylene; polybutylene; polypentene: polyhexene: polyoctene: copolymers of at least one of ethylene, propylene, butene, pentene, 4-methylpentene, hexene and octene, or mixtures thereof.

7. The method of manufacturing a separator for an electrochemical device according to claim 1, wherein the diluent includes at least one selected from the group consisting of paraffin oil, mineral oil, wax, soybean oil, phthalic acid esters, aromatic esters, fatty acids having 10 to 20 carbons; fatty acid alcohols having 10 to 20 carbons; and fatty acid esters.

8. The method of manufacturing a separator for an electrochemical device according to claim 1, wherein a thickness of the porous polyolefin film is from 5 to 50 μm, and a pore size and a porosity are from 0.01 to 50 μm and from 10 to 95%, respectively.

9. The method of manufacturing a separator for an electrochemical device according to claim 1, wherein the slurry for forming a porous coating layer includes at least one type of particles of inorganic particles and organic particles, a binder polymer, and a solvent.

10. The method of manufacturing a separator for an electrochemical device according to claim 9, wherein the binder polymer includes polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, or mixtures thereof.

11. The method of manufacturing a separator for an electrochemical device according to claim 9, wherein the inorganic particles include inorganic particles having a dielectric constant greater than or equal to 5, inorganic particles capable of transporting lithium ions, or mixtures thereof.

12. The method of manufacturing a separator for an electrochemical device according to claim 11, wherein the inorganic particles having a dielectric constant greater than or equal to 5 include $BaTiO_3$, $Pb(Zr,Ti)O_3$(PZT), $Pb_{1-x}La_xZr_{1-y}Ti_yO_3$(PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, or mixtures thereof.

13. The method of manufacturing a separator for an electrochemical device according to claim 11, wherein the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), ($LiAlTiP)_xO_y$, based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ based glass ($Li_xSi_yS_z$, $0<x<3$, $0<y<2$, $0<z<4$), $P_2S_5$ based glass ($Li_xP_yS_z$, $0<x<3$, $0<y<3$, $0<z<7$), or mixtures thereof.

14. The method of manufacturing a separator for an electrochemical device according to claim 9, wherein the organic particles include polystyrene, polyethylene, melamine-based resin, phenol-based resin, cellulose, modified cellulose, polypropylene, polyester, polyphenylene sulfide, polyaramide, polyamide imide, polyimide, butylacrylate-ethylmethacrylate copolymers, or mixtures thereof.

15. The method of manufacturing a separator for an electrochemical device according to claim 9, wherein each average grain diameter of the inorganic particles and the organic particles is independently from 0.001 to 10 μm.

16. The method of manufacturing a separator for an electrochemical device according to claim 1, further comprising:
winding and slitting the composite separator.

17. The method of manufacturing a separator for an electrochemical device according to claim 1, wherein the method does not comprise winding and slitting before the coating of the slurry for forming a porous coating layer.

18. A separator for an electrochemical device manufactured by the method according to claim 4.

19. An electrochemical device comprising a cathode, an anode, and a separator interposed between the cathode and the anode, wherein the separator is the separator for an electrochemical device according to claim 18.

20. The electrochemical device according to claim 19, wherein the electrochemical device is a lithium secondary battery.

* * * * *